(12) United States Patent
Gockel et al.

(10) Patent No.: US 8,105,018 B2
(45) Date of Patent: Jan. 31, 2012

(54) DECOUPLER DEVICES TO PREVENT BACKDRIVE IN AIR TURBINE STARTERS

(75) Inventors: Rich Gockel, Mesa, AZ (US); David Oman, Chandler, AZ (US); Arun Kumar, Chandler, AZ (US); Doug Smith, Phoenix, AZ (US); Joe Silk, Chandler, AZ (US); Ben Ho, Tempe, AZ (US)

(73) Assignee: Honeywell International Inc., Morristown, NJ (US)

( * ) Notice: Subject to any disclaimer, the term of this patent is extended or adjusted under 35 U.S.C. 154(b) by 982 days.

(21) Appl. No.: 12/030,550

(22) Filed: Feb. 13, 2008

(65) Prior Publication Data

US 2009/0199567 A1 Aug. 13, 2009

(51) Int. Cl.
*F01D 15/12* (2006.01)
*F03D 11/02* (2006.01)

(52) U.S. Cl. .................................................. 415/122.1

(58) Field of Classification Search .................. 415/110, 415/122.1
See application file for complete search history.

(56) References Cited

U.S. PATENT DOCUMENTS

| | | | | | |
|---|---|---|---|---|---|
| 2,721,482 | A | * | 10/1955 | Shank et al. | 74/7 C |
| 3,087,305 | A | * | 4/1963 | Hertzog | 60/789 |
| 4,871,296 | A | * | 10/1989 | Laessle et al. | 415/123 |
| 5,284,394 | A | * | 2/1994 | Lemelson | 384/463 |
| 6,059,085 | A | * | 5/2000 | Farnsworth | 192/55.1 |
| 2006/0245676 | A1 | * | 11/2006 | Bruce et al. | 384/192 |
| 2007/0000746 | A1 | * | 1/2007 | Guyader | 192/55.1 |
| 2007/0292263 | A1 | * | 12/2007 | Giesler et al. | 415/122.1 |

* cited by examiner

*Primary Examiner* — Edward Look
*Assistant Examiner* — Su Htay
(74) *Attorney, Agent, or Firm* — Ingrassia Fisher & Lorenz, P.C.

(57) ABSTRACT

An air turbine starter for starting an engine includes a housing, and a flow path communicating a flow of gas therethrough; a turbine member; a clutch; and a decoupler device at least partially housed within the output member of the clutch. The decoupler device includes a first shaft portion coupled to and rotating with the output member and a second shaft portion coupled to and rotating with the engine. The first and second shaft portions are axially aligned and configured to engage each another for rotation in a first direction and to separate from each other in a second direction to decouple the output member of the clutch from the engine. The starter further includes a bearing between the inner surface of the output member and the second shaft portion for reducing friction between the second shaft portion and the inner surface of the output member when the first and second shaft portions are decoupled.

20 Claims, 5 Drawing Sheets

US 8,105,018 B2

DECOUPLER DEVICES TO PREVENT BACKDRIVE IN AIR TURBINE STARTERS

TECHNICAL FIELD

The present invention generally relates to decoupler devices of air turbine starters capable of driving in one direction only, and decoupling in response to a specific torque load in the opposite direction.

BACKGROUND

Air turbine starters are known in the aviation field, and are commonly used to start propulsion turbine engines of modern aircraft. A starter typically includes a clutch that overruns when the turbine engine achieves a certain operating speed. Such overrunning can occur continuously during operation of the turbine engine. In some instances, if problems with the clutch occur, the clutch may transmit reverse torque and backdrive the air turbine starter. To prevent undesirable backdriving of the starter by the turbine engine, a decoupler device is conventionally provided in the power train between the starter and turbine engine.

Unfortunately, a conventional decoupler device may suffer from one or more shortcomings. The conventional decoupler device may be overly large or complex in its construction, can provide a possible source of malfunction or breakdown, may undesirably reset automatically to a torque transmitting condition after it is tripped by a reverse torque, and/or may require extensive time consuming disassembly to reset after being tripped by a reverse torque incident. Moreover, portions of the decoupler device may wear and overheat the starter during a decoupled condition. Overheating of the starter may result in the decoupler device failing to prevent backdriving of the starter.

Accordingly, it is desirable to provide improved decoupler devices for use with air turbine starters. Additionally, it is desirable to provide decoupler devices that reduce wear between the decoupler device and other portions of the starter. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an air turbine starter is provided for starting an engine. The starter includes a housing defining an inlet, an outlet, and a flow path extending between the inlet and the outlet for communicating a flow of gas therethrough; a turbine member journaled within the housing and disposed within the flow path for rotatably extracting mechanical power from the gas flow, a gear train drivingly coupled with the turbine member; a clutch coupled with the gear train and including an output member with an inner surface; and a decoupler device at least partially housed within the output member of the clutch. The decoupler device includes a first shaft portion coupled to and rotating with the output member and a second shaft portion coupled to and rotating with the engine. Each of the first and second portions has outer surfaces. The first and second shaft portions are axially aligned and configured to engage each another for rotation in a first direction and to separate from each other in a second direction to decouple the output member of the clutch from the engine. The starter further includes a bearing between the inner surface of the output member and the second shaft for reducing friction between the second shaft portion and the inner surface of the output member when the first and second shaft portions are decoupled.

In accordance with another exemplary embodiment, a decoupler device is provided for decoupling an output member of a starter from an engine. The decoupler device includes a first shaft portion configured to be coupled to and rotate with the output member; a second shaft portion configured to be coupled to and rotate with the engine, the first and second shaft portions being axially aligned and configured to engage each another for rotation in a first direction and to separate from each other in a second direction to decouple the output member from the engine; and a bearing arranged between the output member and the second shaft portion for reducing friction between the second shaft portion and the output member when the first and second shaft portions are decoupled.

In accordance with yet another exemplary embodiment, an air turbine starter is provided for starting an engine. The starter includes a housing defining an inlet, an outlet, and a flow path extending between the inlet and the outlet for communicating a flow of gas therethrough; a turbine member journaled within the housing and disposed within the flow path for rotatably extracting mechanical power from the gas flow; a gear train drivingly coupled with the turbine member; a clutch coupled with the gear train and including an output member having an inner surface; and a decoupler device at least partially housed within the output member of the clutch. The decoupler device includes a first shaft portion fixed to the output member and a second shaft portion coupled to the engine, with each of the first and second portions having an outer surface. The first and second shaft portions are axially aligned and configured to engage each another for rotation in a first direction and to separate from each other in a second direction to decouple the output member of the clutch from the engine. The starter further includes a bushing positioned between the outer surface of the second shaft portion and the inner surface of the output member of the clutch for reducing friction between the second shaft portion and the inner surface of the output member and to restrict dynamic movement of the second shaft portion when the first and second shaft portions are decoupled.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein provide decoupler devices in starters for engines, typically for aircraft. The decoupler devices function to decouple the starter from the engine during a failure event. Particular exemplary embodiments provide a bearing structure that reduces wear between the decoupler device and other portions of the starter. The bearing structures can include, for example, wear coatings, bushings, ball bearings, and roller bearings.

Figure 1:
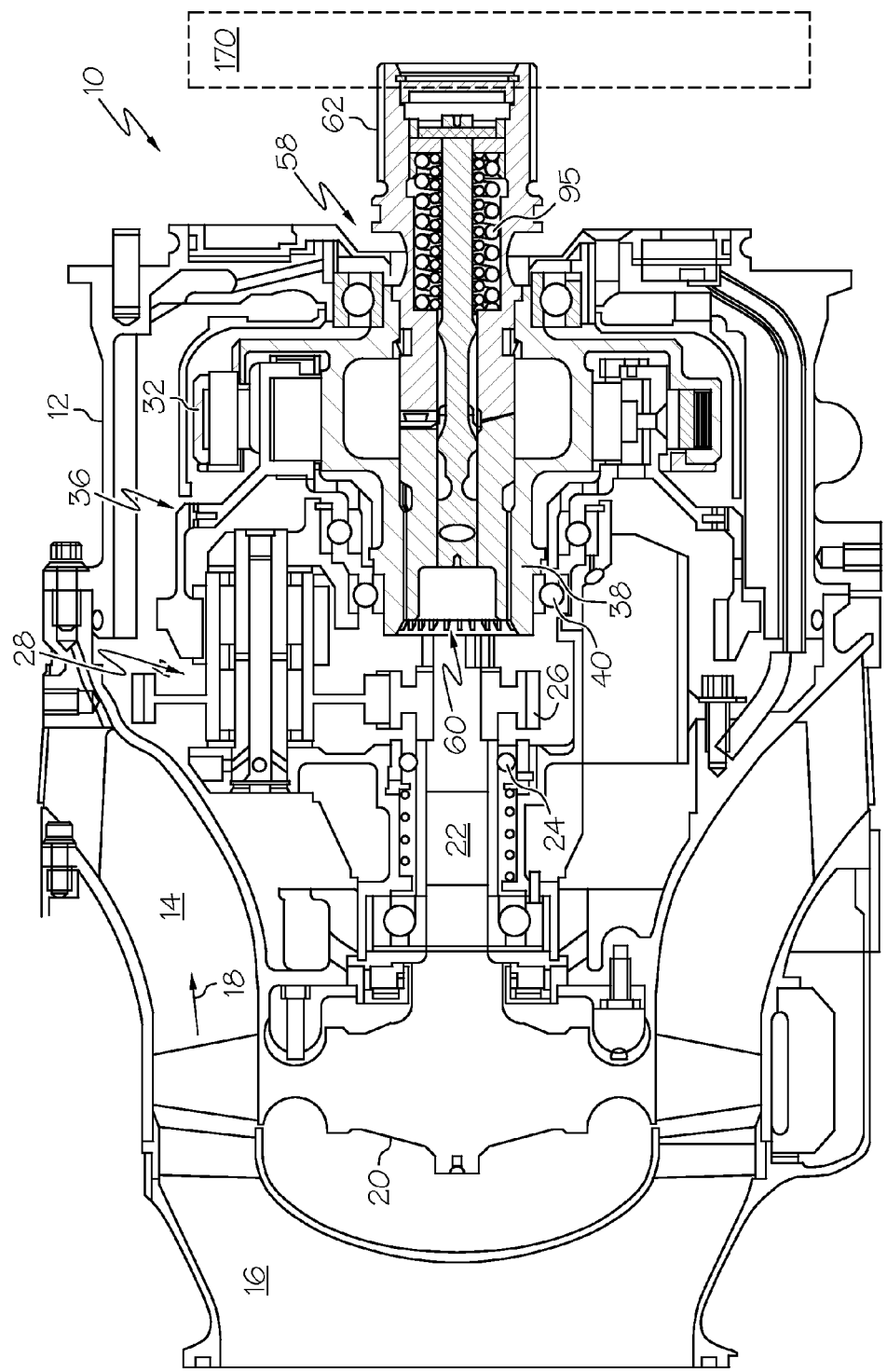
FIG. 1 is a cross-sectional view of an air turbine starter that includes a decoupler device in accordance with an exemplary embodiment.

FIG. 1 depicts a cross-sectional view of an exemplary air turbine starter 10. The air turbine starter 10 includes a housing 12 defining an inlet 16 and an outlet 14. The housing 12 further defines a flow path 18 extending between the inlet 16 and the outlet 14. An axial flow turbine member 20 is rotatably journaled by the housing 12 in the flow path 18 for extracting mechanical energy from a flow of pressurized fluid conducted between the inlet 16 and the outlet 14 via the flow path 18. The turbine member 20 is coupled to a rotatable shaft member 22 journaled by bearings 24 carried by the housing 12. A gear member 26 is coupled to the shaft member 22 and engages a speed-reducing gear train 28. The gear train 28 is coupled to a clutch 36, which includes an output member 38. The clutch 36 can be a sprag clutch of the inner-race-overrunning type or a pawl and ratchet clutch.

The output member 38 is coupled to a decoupler device 58, which is then coupled to a combustion turbine engine 170 such that energy extracted by the turbine member 20 can be used to start the engine. As described in further detail below, the decoupler device 58 functions to decouple the air turbine starter 10 from the engine 170 during a failure condition. The decoupler device 58 drivingly connects with output member 38 via respective inter-engaging male and female spline surfaces, generally indicated at 60. The decoupler device 58 also defines a male spline surface 62 by which the air turbine starter 10 couples in driving relation with a combustion turbine engine 170.

Figure 2:
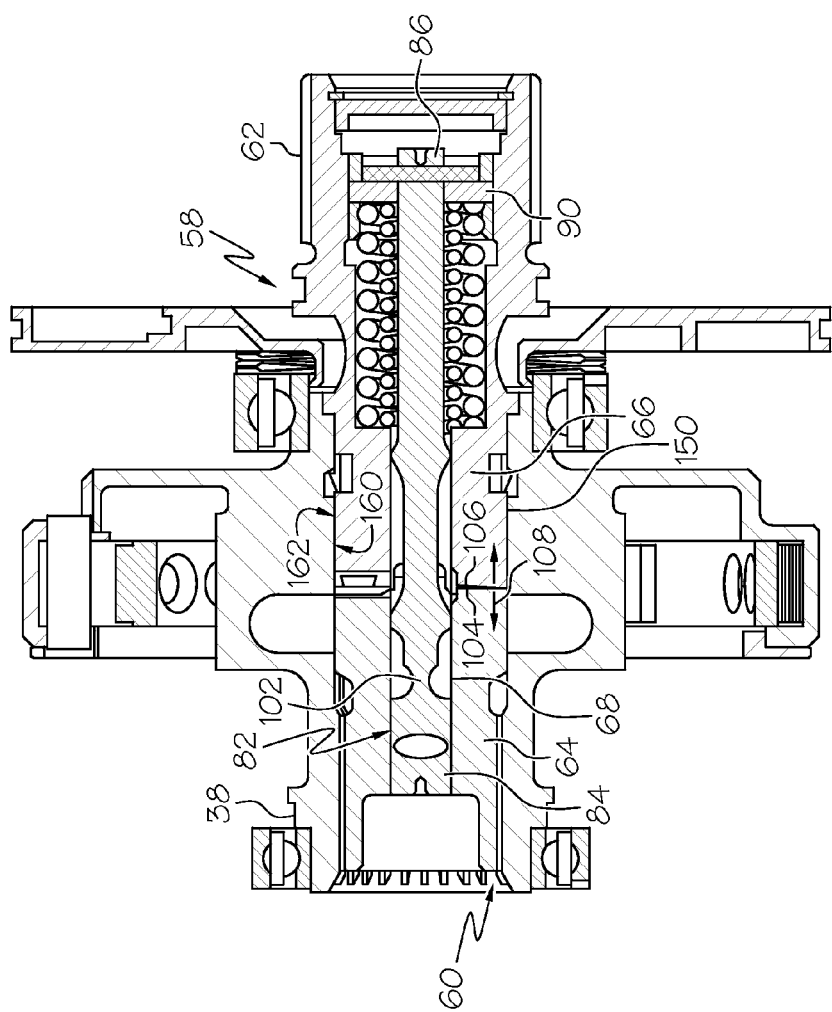
FIG. 2 is an enlarged, partial cross-sectional view of the decoupler device of FIG. 1.

Viewing now FIG. 2 in conjunction with FIG. 1, the decoupler device 58 includes a first axial shaft portion 64 and an adjacent, second axial shaft portion 66. The first axial shaft portion 64 defines the male spline surface 60 that couples with output member 38, while the second shaft portion 66 defines spline surface 62 that couples with the engine. The shaft portions 64, 66 cooperatively define a stepped axial through bore 68.

An elongate tensile bar member 82 is positioned within the through bore 68. The tensile bar member 82 includes a head portion 84 coupled to the first shaft portion 64 and an end portion 86 is coupled to the second shaft portion 66. An annular disk member 90 is carried upon the end portion 86 to fasten the tensile bar member 82 to the shaft portion 66. The tensile bar member 82 connects the shaft portions 64 and 66 with a spring load from spring 95, and it will be noted that tensile bar member 82 includes a neck portion 102 with a reduced diameter, the function of which will be further described below.

The shaft portions 64, 66 each include matching interengageable surfaces 104, 106, respectively. The surfaces 104, 106 can include alternating ramp and driving surfaces. The surfaces 104, 106 are configured such that first relative torques urge these surfaces into contact and the shaft portions 64, 66 rotate together. On the other hand, the surfaces 104, 106 are configured such that second relative torques urge the surfaces 104, 106 apart and separate shaft portions 64, 66, as is depicted by arrow 108. In other words, the surfaces 104, 106 of the shaft portions 64, 66 are configured to rotate together in a first direction, but to separate when the relative torques attempt to rotate the shaft portions 64, 66 in the opposite direction.

Having described the structure of the air turbine starter 10, attention may now be given to its operation. During a normal start cycle of a combustion turbine engine with both the air turbine starter 10 and the engine being stationary, a supply of pressurized fluid is connected to the inlet 16 of the air turbine starter 10. Viewing FIG. 1, it will be seen that a flow of pressurized fluid through the housing 12 via the flow path 18 will cause the turbine member 20 to extract mechanical power there from and to deliver this power to the output member 38 of the clutch 32 via the gear train 28. The output member 38 drivingly connects with the first shaft portion 64 of the decoupled device 58. Engine starting torque applied to the first shaft portion 64 urges the surfaces 104, 106 of the shaft portions 64, 66 into engagement with each other such that the second shaft portion 66 conveys the engine starting power to the turbine engine substantially without axial force within the decoupler device 58. Accordingly, the air turbine starter 10 delivers mechanical power to the decoupler device 58 thereof, and to the combustion turbine engine connected thereto, to accelerate the latter towards its self-sustaining speed.

Upon the combustion turbine engine obtaining its self-sustaining speed, the supply of pressurized air to flow path 18 is shut off and the shaft of the engine will accelerate ahead of the output member 38 of the air turbine starter 10. Consequently, torque loading within the clutch 36 will be eliminated, and the starter 10 overruns with respect to the engine. As a result, the turbine and drive train sections of the air turbine starter 10 coasts to a stop and remains stopped during operation of the turbine engine. The output section of the clutch 36 of the starter 10 continues overrunning as long as the engine operates.

Certain events may cause a physical malfunction in the air turbine starter 10. For example, one or more of the sprags of clutch 36 flips over center such that the turbine engine back drives the air turbine starter 10 to a high and destructive speed, or alternatively, one of the bearings 40 could fail and seize so that a high resisting torque load becomes imposed on the turbine engine. During these types of events, the decoupler device 58 can function to prevent further damage. Viewing FIG. 2, it will be seen that reverse torque applied to the shaft portion 66 urges the surfaces 104, 106 apart to result in an axial separation 108 between the shaft portions 64, 66. Thereafter, further increased reverse torque can be transmitted from the second shaft portion 66 to the first shaft portion 64 only with the development of a directly related torsion force imposed on tensile bar member 82. The neck portion 102 of tensile bar member 82 is sized such that the member 82 will fail in torsion at a predetermined stress level. That is, the tensile bar member 82 fractures at the neck portion 102 when a predetermined level of reverse torque is imposed upon decoupler device 58.

As a result of the tensile bar member 82 fracturing at the neck portion 102, the shaft portions 64, 66 are allowed to rotate relative to one another in response to the reverse torque. The surfaces 104, 106 may additionally move the shaft portion 64 leftwardly in the view of FIG. 2 and/or the shaft portion 66 rightwardly in the view of FIG. 2. In this position, the surfaces 104, 106 are disengaged from one another. As a result of the disengagement of the shaft portions 64, 66, the first shaft portion 64 and output member 38 of the clutch 36 are no longer driven by the second shaft portion 66, and the second shaft portion 66 rotates relative to the first shaft portion 64 and the output member 38.

One or more bearing structures can be provided to reduce wear between the second shaft portion 66 and the output member 38. For example, in the embodiment of FIG. 2, a wear coating 150 is provided between the second shaft portion 66 and the output member 38. The coating 150 can be provided on the some or all of the outer surfaces (e.g., surface 160) of the second shaft portion 66, some or all of the inner surfaces (e.g., surface 162) of output member 38, and/or some or all of both the outer surfaces of the second shaft portion 66 and the inner surfaces of the output member 38. The coating 150 can be, for example, a tungsten-cobalt carbide coating, or any other coating suitable to reduce wear between the shaft portion 66 and the output member 38. The coating 150 can have a thickness of, for example, 0.005-0.01 inches, although other thicknesses can be provided based on materials of the second shaft portion 66 and the output member 38, starter conditions, and/or desired level of wear reduction or prevention.

Figure 3:
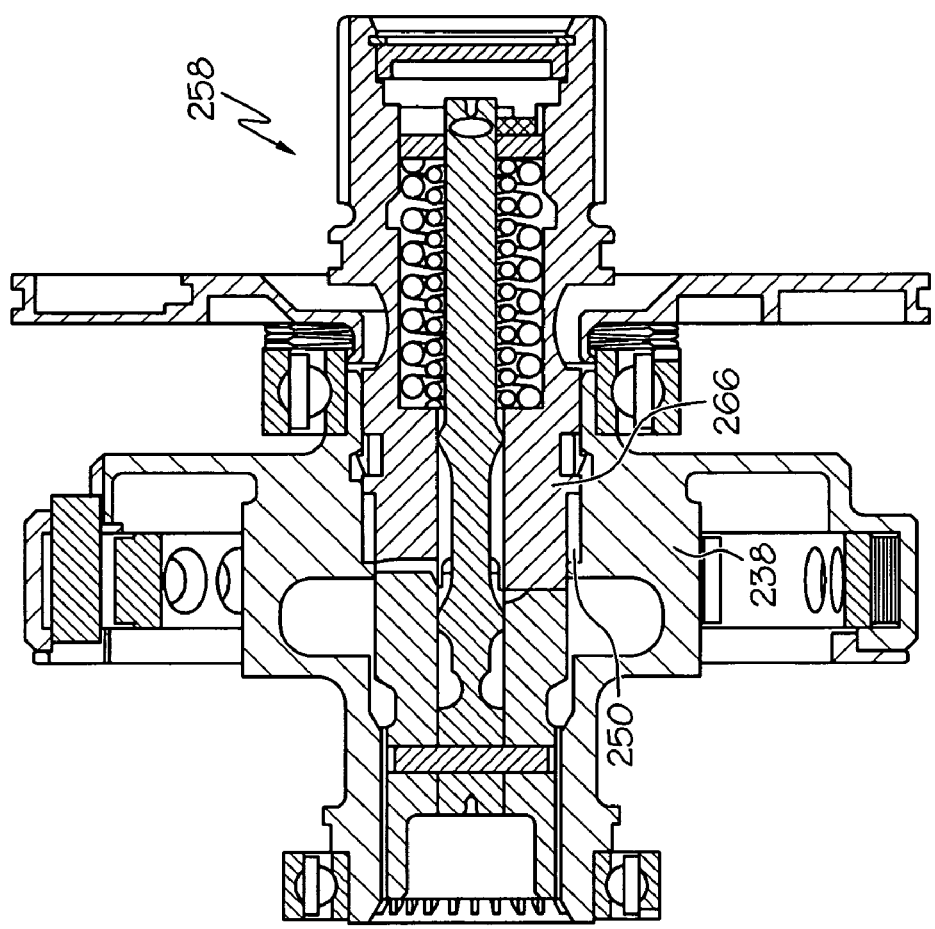
FIG. 3 is an enlarged, partial cross-sectional view of a starter with a decoupler device in accordance with an alternate embodiment.

FIG. 3 is an enlarged cross-sectional view of a starter with a decoupler device 258 in accordance with an alternate exemplary embodiment from the decoupler device 58 of FIG. 2. In this embodiment, a bushing 250 is provided to reduce or prevent wear between the second shaft portion 266 and the output member 238. The bushing 250 can be a cylindrically shaped sleeve or tube that can be mounted on the inner diameter of the output member 238 or the outer diameter of the shaft 266. The bushing 250 can have a thickness of about 0.080 inches, although other thickness and shapes can be provided. The bushing 250 may also serve to constrain or restrict the dynamic movement of the second shaft portion 266.

Figure 4:
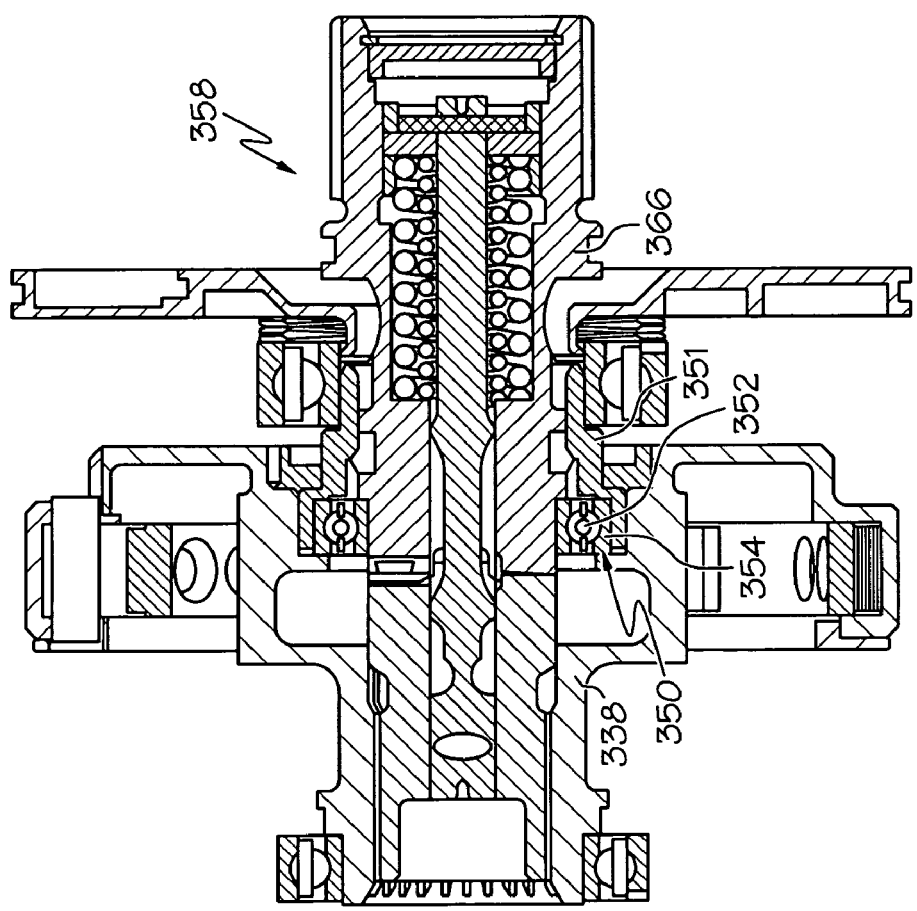
FIG. 4 is an enlarged, partial cross-sectional view of a starter with a decoupler device in accordance with another alternate embodiment.

FIG. 4 is an enlarged cross-sectional view of a starter with a decoupler device 358 in accordance with another alternate exemplary embodiment. In this embodiment, a ball bearing 350 is mounted between the second shaft portion 366 and the output member 338 to reduce or prevent wear. A housing element 351 can be provided to house the ball bearing 350. The ball bearing 350 includes balls 352 and bearing rings 354. The ball bearing 350 may also support both axial and radial dynamic and static loads between the second shaft portion 366 and the output member 338. The ball bearing 350 can be manufactured from materials such as AISI52100 or AISI440C.

Figure 5:
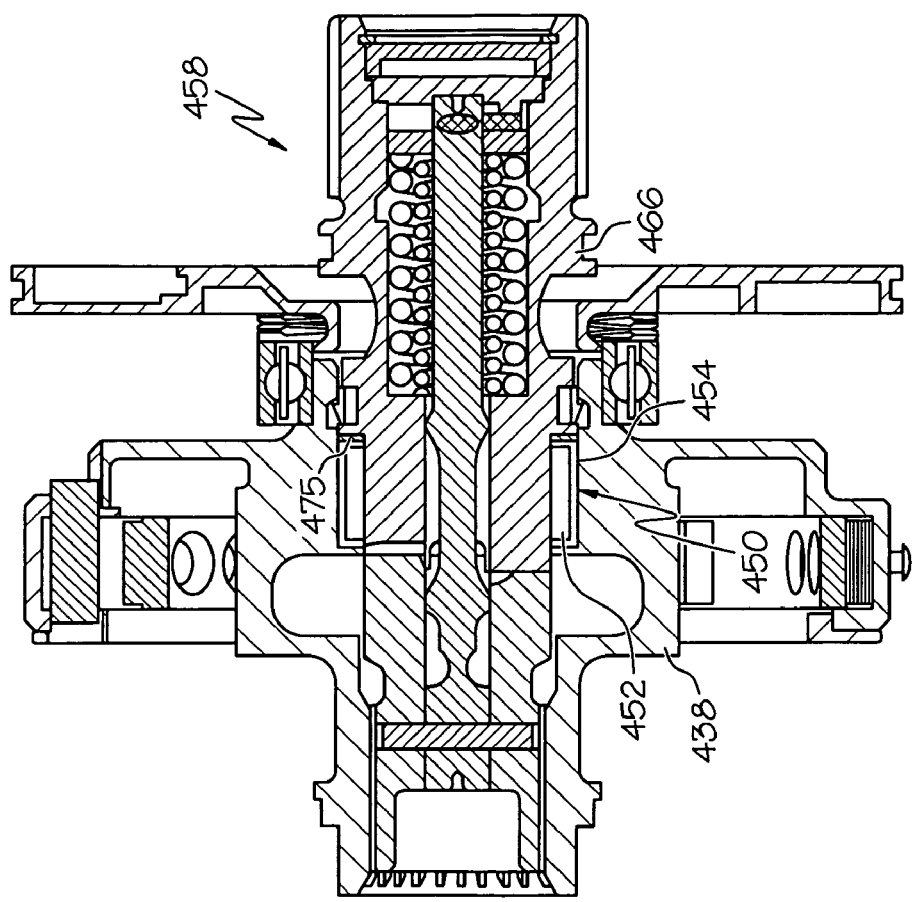
FIG. 5 is an enlarged, partial cross-sectional view of a starter with a decoupler device in accordance with yet another alternate embodiment.

FIG. 5 is an enlarged cross-sectional view of a starter with a decoupler device 458 in accordance with yet another alternate exemplary embodiment. In this embodiment, a roller bearing 450 is mounted between the second shaft portion 466 and the output member 438 to reduce or prevent wear. A thrust washer 475 is located between shaft portion 466 and bearing 450. The roller bearing 450 includes rollers 452 and ring 454. The roller bearing 450 in combination with the thrust washer 475 may also support both axial and radial dynamic and static loads between the second shaft portion 466 and the output member 438. The roller bearing 450 can be manufactured from materials such as AISI52100, AISI440C or AISI1020.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An air turbine starter for starting an engine, comprising:
 a housing defining an inlet, an outlet, and a flow path extending between the inlet and the outlet for communicating a flow of gas therethrough;
 a turbine member journaled within the housing and disposed within the flow path for rotatably extracting mechanical power from the flow of gas;
 a gear train drivingly coupled with the turbine member;
 a clutch coupled with the gear train, the clutch including an output member with an inner surface;
 a decoupler device at least partially housed within the output member of the clutch, the decoupler device comprising a first shaft portion coupled to and rotating with the output member and a second shaft portion coupled to and rotating with the engine, each of the first shaft and second shaft portions having an outer surface, the first shaft and second shaft portions being axially aligned and configured to engage with each other for rotation in a first direction and to separate from each other in a second direction to decouple the output member of the clutch from the engine; and
 a bearing between the inner surface of the output member and the second shaft portion for reducing friction between the second shaft portion and the inner surface of the output member when the first and second shaft portions are decoupled.

2. The starter of claim 1, wherein the bearing is positioned on the outer surface of the second shaft portion.

3. The starter of claim 1, wherein the bearing is a wear coating.

4. The starter of claim 3, wherein the wear coating is a first wear coating on the outer surface of the second shaft portion, and the bearing further comprises a second wear coating on the inner surface of the output member.

5. The starter of claim 3, wherein the wear coating has a thickness of about 0.005 inches to about 0.01 inches.

6. The starter of claim 3, wherein the wear coating comprises a tungsten-cobalt carbide coating.

7. The starter of claim 1, wherein the second shaft portion has an outer surface, and the bearing is a bushing positioned on the outer surface of the second shaft portion.

8. The starter of claim 1, wherein the bearing is a ball bearing structure.

9. The starter of claim 8, wherein the ball bearing structure includes an inner bearing ring arranged on the outer surface of the second shaft portion and an outer bearing ring arranged proximate to the inner surface of the output member.

10. The starter of claim 1, wherein the bearing is a roller bearing structure.

11. The starter of claim 10, wherein the roller bearing structure includes a bearing ring arranged on the outer surface of the second shaft portion.

12. The starter of claim 1, wherein the bearing is configured to restrict dynamic movement of the second shaft portion.

13. A decoupler device for decoupling an output member of a starter from an engine, the decoupler device comprising:
 a first shaft portion configured to be coupled to and rotate with the output member;
 a second shaft portion configured to be coupled to and rotate with the engine, the first and second shaft portions being axially aligned and configured to engage with each other for rotation in a first direction and to separate from each other in a second direction to decouple the output member from the engine; and a bearing arranged between the output member and the second shaft portion for reducing friction between the second shaft portion and the output member when the first and second shaft portions are decoupled.

14. The device of claim 13, wherein the bearing is positioned within an inner surface of the output member.

15. The device of claim 13, wherein the bearing is a wear coating.

16. The device of claim 15, wherein the wear coating has a thickness of about 0.005 inches to about 0.01 inches.

17. The device of claim 13, wherein the bearing is a bushing positioned within an inner surface of the output member.

18. The device of claim 13, wherein the bearing is a ball-bearing structure.

19. The device of claim 13, wherein the bearing is a roller bearing structure.

20. An air turbine starter for starting an engine, comprising:

a housing defining an inlet, an outlet, and a flow path extending between the inlet and the outlet for communicating a flow of gas therethrough;

a turbine member journaled within the housing and disposed within the flow path for rotatably extracting mechanical power from the flow of gas;

a gear train drivingly coupled with the turbine member;

a clutch coupled with the gear train, the clutch including an output member having an inner surface;

a decoupler device at least partially housed within the output member of the clutch, the decoupler device comprising a first shaft portion fixed to the output member and a second shaft portion coupled to the engine, each of the first shaft and second shaft portions having an outer surface, the first shaft and second shaft portions being axially aligned and configured to engage with each other for rotation in a first direction and to separate from each other in a second direction to decouple the output member of the clutch from the engine; and a bushing positioned between the inner surface of the output member and the second shaft portion for reducing friction between the second shaft portion and the inner surface of the output member and restrict dynamic movement of the second shaft portion when the first and second shaft portions are decoupled.

* * * * *